(12) United States Patent
Matsumoto et al.

(10) Patent No.: US 8,277,944 B2
(45) Date of Patent: Oct. 2, 2012

(54) PRIMER COMPOSITION, WATERPROOF FLOOR SLAB STRUCTURE USING THE SAME, AND METHOD FOR WATERPROOFING FLOOR SLAB

(75) Inventors: Takashi Matsumoto, Osaka (JP); Yuko Takikawa, Osaka (JP); Toshio Mita, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/498,209

(22) PCT Filed: Sep. 28, 2010

(86) PCT No.: PCT/JP2010/066763
§ 371 (c)(1),
(2), (4) Date: Mar. 26, 2012

(87) PCT Pub. No.: WO2011/040384
PCT Pub. Date: Apr. 7, 2011

(65) Prior Publication Data
US 2012/0189857 A1 Jul. 26, 2012

(30) Foreign Application Priority Data
Sep. 29, 2009 (JP) ................................. 2009-224372

(51) Int. Cl.
*B32B 27/40* (2006.01)
*C08G 18/00* (2006.01)
*B35D 5/10* (2006.01)

(52) U.S. Cl. ........................ 428/423.1; 524/267; 528/44
(58) Field of Classification Search .................. 524/261, 524/267; 528/44; 428/423.1; 427/138
See application file for complete search history.

(56) References Cited

FOREIGN PATENT DOCUMENTS

| | | |
|---|---|---|
| JP | 62-30641 A | 2/1987 |
| JP | 62-148514 A | 7/1987 |
| JP | 6-107754 A | 4/1994 |
| JP | 8-311805 A | 11/1996 |
| JP | 2003-166201 A | 6/2003 |
| JP | 2004-27630 A | 1/2004 |

*Primary Examiner* — Thao T. Tran
(74) *Attorney, Agent, or Firm* — McDermott Will & Emery LLP

(57) ABSTRACT

A primer composition used for applying a radical-curable resin-based waterproof material onto a concrete floor slab of an existing or newly established road bridge, is a troublesome application. For example, it is a problem in that a large machine is required for application thereof. The primer composition is a resin composition containing a urethane (meth) acrylate resin, (B) a polymerizable unsaturated monomer containing a hydroxyalkyl (meth)acrylate (B-1) and another polymerizable unsaturated monomer (B-2), (C) a curing accelerator, (D) a paraffin wax, and (E) a drying aid, in which the above components satisfy a specific molar ratio and specific mass ratios. The primer composition has a good crack-load-following capability, blistering resistance, adhesiveness, and bending resistance. Also provided is a waterproof floor slab structure using the primer composition and a method for waterproofing a floor slab.

7 Claims, No Drawings

PRIMER COMPOSITION, WATERPROOF FLOOR SLAB STRUCTURE USING THE SAME, AND METHOD FOR WATERPROOFING FLOOR SLAB

CROSS REFERENCE TO PRIOR APPLICATIONS

This application is a U.S. National Phase application under 35 U.S.C. §371 of International Application No. PCT/JP2010/066763, filed on Sep. 28, 2010 and claims benefit of priority to Japanese Patent Application No. 2009-224372, filed on Sep. 29, 2009. The International Application was published in Japanese on Apr. 7, 2011 as WO 2011/040384 A1 under PCT Article 21(2). The contents of the applications are hereby incorporated by reference.

TECHNICAL FIELD

The present invention relates to a primer composition used for applying a radical-curable resin-based waterproof material for a floor slab and having a good crack-load-following capability, blistering resistance, adhesiveness, and bending resistance, and to a waterproof floor slab structure using the same and a method for waterproofing a floor slab.

BACKGROUND ART

Recently, early degradation of floor slabs of road bridges such as highway brides has become a problem. More specifically, rainwater, an anti-freezing agent, and the like infiltrate into structures through cracks generated in asphalt pavements and reinforced concrete floor slabs (hereinafter referred to as "RC floor slabs") and corrode reinforcing bars, thereby decreasing the durability of the structures. Therefore, for the purpose of extending the lifetime of RC floor slabs, in the design specification for road bridges, the Ministry of Land, Infrastructure, Transport and Tourism has stated that a waterproof layer must be provided on RC floor slabs. In June 2001, Nippon Expressway Company Limited (NEXCO) (former Japan Highway Public Corporation) prepared a manual (hereinafter referred to as "JH standards") regarding a waterproof system for concrete floor slabs. If these standards are satisfied, it is deemed that the floor slab will have a durability of 30 years. These standards are used to strictly evaluate a performance from an initial performance to a long-term performance, such as resistance to opening and closing of cracks, repeated heating/cooling resistance, resistance to paving, salt resistance, and chemical resistance. With regard to these standards, a particularly severe test is the "opening and closing of cracks" in which a fatigue test is performed as many as 4,800,000 times.

At present, there are three types of waterproof layer structures for floor slabs, namely, a sheet structure, a coating structure, and a paving structure. Among these, the paving structure is the least popular because the waterproof performance of the paving structure is poorer than those of the other two structures Examples of known waterproof coating materials for floor slabs include a urethane urea resin-based waterproof material (PTL 1) and an ether-bond-containing radical-curable resin-based waterproof material (PTL 2).

The urethane urea resin-based waterproof material has an elongation performance that satisfies resistance to the "opening and closing of cracks" and good adhesiveness to a concrete base. However, this urethane urea resin-based waterproof material has problems of troublesome application thereof, for example, a problem in that a large machine is required for application thereof. In contrast, the radical-curable resin-based waterproof material does not require such a large machine and is attractive as a material that can be applied within a short time. However, no radical-curable primers have been developed that have good adhesiveness to a concrete base and resistance to "opening and closing of cracks" as well as a good elongation performance. Accordingly, a radical-curable resin-based waterproof material has yet to be provided as a waterproof system that satisfies resistance to "opening and closing of cracks" and that can be applied within a short time.

CITATION LIST

Patent Literature

PTL 1: Japanese Unexamined Patent Application Publication No. 2003-166201
PTL 2: Japanese Unexamined Patent Application Publication No. 08-311805

SUMMARY OF INVENTION

Technical Problem

An object of the present invention is to provide a primer composition which is used for applying a radical-curable resin-based waterproof material for a floor slab onto an RC floor slab of an existing or newly established road bridge such as a highway bridge. Specifically, provided is a primer composition that has a good crack-load-following capability, blistering resistance, adhesiveness, and bending resistance and that can be used for forming a waterproof layer composed of a radical-curable resin-based waterproof material for a floor slab, for which a problem of troublesome application thereof, for example, a problem in that a large machine is required for application thereof, is solved. That is, an object of the present invention is to provide a primer composition for forming a waterproof layer for a floor slab, a waterproof floor slab structure using the same, and a method for waterproofing a floor slab.

Solution to Problem

The inventors of the present invention have conducted intensive studies on the resin structure, the composition, and the like of radical-curable resins for a primer with which a radical-curable resin-based waterproof material for a floor slab, the waterproof material containing a wax and a curing accelerator, can be used. As a result, it was found that the problems regarding the crack-load-following capability, blistering resistance, adhesiveness, and bending resistance can be solved by using a urethane methacrylate resin of a specific polyol or a mixture of the polyol and a monomer mixture of specific polymerizable unsaturated monomers in a specific molar ratio and specific mass ratios. This finding resulted in completion of the present invention.

Specifically, the present invention provides a primer composition being a resin composition containing (A) a urethane (meth)acrylate resin (A-1) obtained by reacting a hydroxyalkyl (meth)acrylate (A-1-3) with a terminal-isocyanate-group-containing urethane prepolymer obtained by reacting polytetramethylene glycol (A-1-1) having a number-average molecular weight of 650 to 3,000 with a polyisocyanate component (A-1-2), or a mixture of the urethane (meth)acrylate resin (A-1) and a urethane (meth)acrylate resin (A-2) obtained by reacting a hydroxyalkyl (meth)acrylate (A-2-3)

with a terminal-isocyanate-group-containing urethane prepolymer obtained by reacting a polyether polyol (A-2-1) selected from polyoxypropylene diol and polyoxyethylene diol and having a number-average molecular weight of 650 to 2,000 with a polyisocyanate component (A-2-2); (B) a polymerizable unsaturated monomer containing a hydroxyalkyl (meth)acrylate (B-1) and another polymerizable unsaturated monomer (B-2); (C) a curing accelerator; (D) a paraffin wax; and (E) a drying aid, in which a molar ratio of the (B)/the (A) is 4 to 20, a mass ratio of the (A-1)/the (A-2) is 100/0 to 10/90, and a mass ratio of the (B-1)/the (B-2) is 35/65 to 5/95. The present invention also provides a waterproof floor slab structure using the primer composition and a method for waterproofing a floor slab.

Advantageous Effects of Invention

According to the present invention, a resin composition contains a specific (A) urethane (meth)acrylate resin, (B) polymerizable unsaturated monomer containing a hydroxyalkyl (meth)acrylate (B-1) and another polymerizable unsaturated monomer (B-2), (C) curing accelerator, (D) paraffin wax, and (E) drying aid, and these components are contained in a specific molar ratio or a specific mass ratio. Therefore, it is possible to obtain a primer composition for waterproofing a floor slab, the primer composition having a good crack-load-following capability, blistering resistance, adhesiveness, and bending resistance. Accordingly, it is possible to provide a waterproof floor slab structure that satisfies resistance to "opening and closing of cracks" and a method for waterproofing a floor slab, in which a large coating machine is not required because a radical-curable resin-based system is used.

DESCRIPTION OF EMBODIMENTS

The urethane (meth)acrylate resin (A) used in the present invention is a urethane (meth)acrylate resin (A-1) obtained by reacting a hydroxyalkyl (meth)acrylate (A-1-3) with a terminal-isocyanate-group-containing urethane prepolymer preferably in an NCO/OH ratio of 0.99/1 to 1/1, the terminal-isocyanate-group-containing urethane prepolymer being obtained by reacting polytetramethylene glycol (A-1-1) having a number-average molecular weight of 650 to 3,000 with a polyisocyanate component (A-1-2) preferably in an NCO/OH ratio of 1.5/1 to 2/1. Alternatively, the urethane (meth) acrylate resin (A) used in the present invention is a mixture of the above urethane (meth)acrylate resin (A-1) and a urethane (meth)acrylate resin (A-2) obtained by reacting a hydroxyalkyl (meth)acrylate (A-2-3) with a terminal-isocyanate-group-containing urethane prepolymer preferably in an NCO/OH ratio of 0.99/1 to 1/1, the terminal-isocyanate-group-containing urethane prepolymer being obtained by reacting a polyether polyol (A-2-1) selected from polyoxypropylene diol and polyoxyethylene diol and having a number-average molecular weight of 650 to 2,000 with a polyisocyanate component (A-2-2) preferably in an NCO/OH ratio of 1.5/1 to 2/1. Preferably, the urethane (meth)acrylate resin (A) is a urethane methacrylate resin. As a polyether polyol component used here, other polyols such as a polyester polyol, a polyacrylic polyol, and a polycarbonate polyol may be used in combination as long as the advantages of the present invention are not impaired.

The polytetramethylene glycol (A-1-1) has a number-average molecular weight of 650 to 3,000, preferably 650 to 2,000, and particularly preferably 1,000 to 2,000 determined by gel permeation chromatography on a polystyrene equivalent basis. The polyether polyol (A-2-1) is selected from polyoxypropylene diol (hereinafter abbreviated as "PPG") and polyoxyethylene diol and has a number-average molecular weight of 650 to 3,000 determined by gel permeation chromatography on a polystyrene equivalent basis. A number-average molecular weight of the (A-1-1) of higher than 3,000 is not preferable because the result of a tensile adhesive strength test is poor. A number-average molecular weight of the (A-1-1) of lower than 650 is also not preferable because a $-10°$ C.×180-degree bending property is poor.

Examples of the polyisocyanate component (A-1-2) or (A-2-2) include 2,4-tolylene diisocyanate, isomers thereof, and mixtures of the isomers (hereinafter abbreviated as "TDIs"), diphenylmethane diisocyanate, hexamethylene diisocyanate, isophorone diisocyanate, xylylene diisocyanate, hydrogenated xylylene diisocyanate, dicyclohexylmethane diisocyanate, tolidine diisocyanate, naphthalene diisocyanate, triphenylmethane triisocyanate, BURNOCK D-750 (product of DIC Corporation), CRISVON NX (product of DIC Corporation), Desmodur L (product of Sumitomo Bayer Urethane Co., Ltd.), and CORONATE L (product of Nippon Polyurethane Industry Co., Ltd.). In particular, TDIs are preferably used.

Examples of the hydroxyalkyl (meth)acrylate (A-1-3), (A-2-3), or (B-1) include 2-hydroxyethyl methacrylate, 2-hydroxypropyl methacrylate, 2-hydroxyethyl acrylate, 2-hdroxypropyl acrylate, 4-hydroxybutyl acrylate, and 4-hdroxybutyl methacrylate. 2-Hydroxyethyl methacrylate is preferable.

Allyl ether compounds of polyhydric alcohols, such as ethylene glycol monoallyl ether, diethylene glycol monoallyl ether, propylene glycol monoallyl ether, dipropylene glycol monoallyl ether, 1,2-butylene glycol monoallyl ether, trimethylolpropane diallyl ether, glycerol diallyl ether, and pentaerythritol triallyl ether may be used in combination with the (A-1-3) and the (A-2-3) as long as the advantages of the present invention are not impaired.

The mixing ratio of the urethane (meth)acrylate resin (A-1)/the urethane (meth)acrylate resin (A-2) is 100/0 to 30/70 on a mass basis. A mixing ratio out of this range is not preferable because the $-10°$ C.×180-degree bending property is poor and a crack-load-following capability decreases.

A molar ratio of the (B)/the (A) is 4.0 to 20, and preferably 5 to 18. A molar ratio of smaller than 4.0 is not preferable because the viscosity increases and coating workability is poor. A molar ratio of larger than 20 is also not preferable because the $-10°$ C.×180-degree bending property is poor.

The other polymerizable unsaturated monomer (B-2) is a (meth)acrylic compound and is a monomer having one (meth)acryloyl group, the monomer being a liquid at room temperature. Examples thereof include methyl acrylate, ethyl acrylate, n-butyl acrylate, isobutyl acrylate, t-butyl acrylate, 2-ethylhexyl acrylate, n-octyl acrylate, decyl acrylate, lauryl acrylate, stearyl acrylate, polycaprolactone acrylate, diethylene glycol monomethyl ether monoacrylate, dipropylene glycol monomethyl ether monoacrylate, 2-ethylhexylcarbitol acrylate, methyl methacrylate, ethyl methacrylate, n-butyl methacrylate, isobutyl methacrylate, t-butyl methacrylate, hexyl methacrylate, 2-ethylhexyl methacrylate, n-octyl methacrylate, decyl methacrylate, lauryl methacrylate, stearyl methacrylate, polycaprolactone methacrylate, diethylene glycol monomethyl ether monomethacrylate, dipropylene glycol monomethyl ether monomethacrylate, 2-ethylhexylcarbitol methacrylate, phenoxyethyl acrylate, phenol ethylene oxide (EO)-modified acrylate, nonylphenylcarbitol acrylate, nonylphenol EO-modified acrylate, phenoxypropyl acrylate, phenol propylene oxide (PO)-modified acrylate, nonylphenoxy propyl acrylate, nonylphenol PO-modified acrylate, acryloyloxyethyl phthalate, phenoxyethyl methacrylate, phenol EO-modified methacrylate, nonylphenylcarbitol methacrylate, nonylphenol EO-modified methacrylate, phenoxypropyl methacrylate, phenol PO-modified methacrylate, nonylphenoxy propyl methacrylate, nonylphenol PO-modified methacrylate, methacryloyloxy ethyl phthalate, and dicyclopentenyloxyethyl (meth)acrylate. Among these, phenoxyethyl (meth)acrylate and dicyclopentenyloxyethyl (meth)acrylate, which have a molecular weight of 180 or more and which have a property of not being easily volatilized, are preferable because in the case where any of these compounds is used in combination with 2-hydroxyethyl methacrylate, which has a hydrogen bond and which has a property of not being easily volatized, even if a slight amount of any of these compounds remains in a coating film in an unreacted state, it does not easily form total volatile organic compounds (TVOC).

Furthermore, a reactive monomer having an unsaturated group, e.g., styrene, vinyl acetate, vinyltoluene, and α-methyl toluene may be used in combination as long as the advantages of the present invention are not impaired.

A monomer having at least two ethylenically unsaturated groups, preferably two (meth)acryloyl groups, per molecule may be used in combination with the polymerizable unsaturated monomer (B) as long as the advantages of the present invention are not impaired. By using this monomer in combination, it is possible to improve abrasion resistance, scratch resistance, agitation resistance, chemical resistance, and the like of the surfaces of cured products. Examples of the compound having at least two ethylenically unsaturated groups per molecule include alkanediol di(meth)acrylates such as ethylene glycol di(meth)acrylate, 1,2-propylene glycol di(meth)acrylate, 1,3-butylene glycol di(meth)acrylate, and 1,6-hexanediol di(meth)acrylate; dipropylene glycol di(meth)acrylate; triethylene glycol di(meth)acrylate; tetraethylene glycol di(meth)acrylate; and polyoxyalkylene glycol di(meth)acrylates such as polyethylene glycol di(meth)acrylate. These may be used alone or in combination of two or more. Furthermore, divinylbenzene, diallyl phthalate, diallyl isophthalate, diallyl tetrabromophthalate, triallyl phthalate, and the like may also be used as long as the advantages of the present invention are not impaired.

Regarding the polymerizable unsaturated monomer (B), a ratio (B-1)/(B-2) is 35/65 to 5/95 in terms of mass ratio. If the (B-1) is out of this range, water resistance is poor. If the (B-2) is out of this range, tensile adhesiveness to a concrete floor slab is poor.

The mixing molar ratio (B)/(A) of the polymerizable unsaturated monomer (B) to the urethane (meth)acrylate resin (A) is 4 to 20, and preferably 5 to 18. If the (A) is smaller than 4, the viscosity of the resin composition increases and coating workability is poor, which is not preferable. If the (A) is larger than 20, the $-10°$ C.$\times$180-degree bending property of cured products is poor, which is not preferable.

The curing accelerator (C) is preferably an amine compound. Examples thereof include amines such as N,N-substituted anilines, N,N-substituted-p-toluidine, and 4-(N,N-substituted amino)benzaldehyde, e.g., aniline, N,N-dimethylaniline, N,N-diethylaniline, p-toluidine, N,N-dimethyl-p-toluidine, N,N-bis(2-hydroxyethyl)-p-toluidine (abbreviated as "PTD-2EO"), N-methyl-N-(2-hydroxyethyl)-p-toluidine, N-ethyl-N-(2-hydroxyethyl)-p-toluidine, N-methyl-N-(2-hydroxyethyl)-m-toluidine, N-ethyl-N-(2-hydroxyethyl)-m-toluidine, 4-(N,N-dimethylamino)benzaldehyde, 4-[N,N-bis(2-hydroxyethyl)amino]benzaldehyde, 4-(N-methyl-N-hydroxyethyl amino)benzaldehyde, N,N-bis (2-hydroxypropyl)-p-toluidine, N-ethyl-m-toluidine, triethanolamine, m-toluidine, diethylenetriamine, pyridine, phenylmorpholine, piperidine, N,N-bis(hydroxyethyl)aniline, and diethanolaniline. Among these, N,N-substituted-p-toluidines are more preferable, and PTD-2EO is particularly preferable. The amount of curing accelerator (C) added is preferably 0.1 to 3 parts by mass and more preferably 0.3 to 1 part by mass relative to 100 parts by mass of a total of the components (A) and (B).

The paraffin wax (D) is added as a component that assists drying of a coating film. For example, petroleum wax or synthetic wax, i.e., polyethylene wax, oxidized paraffin, alcohol-type wax, or the like can be used. A paraffin wax having a melting point of 115° F. to 155° F. (Fahrenheit) is preferable. Herein, the melting point is measured in accordance with JIS K 2235. The paraffin wax (D) is preferably added so that the amount of paraffin wax (D) is 500 ppm to 10,000 ppm relative to the primer composition. Furthermore, from the standpoint of a drying property and a viscosity, the amount of paraffin wax (D) added is more preferably 2,000 ppm to 8,000 ppm.

The drying aid (E) is a component that assists drying of a coating film, and preferably a cobalt organic acid salt. Examples of the cobalt organic acid salt include metal soap such as cobalt naphthenate and cobalt octoate. The amount of drying aid (E) added is preferably 0.1 to 3 parts by mass and more preferably 0.3 to 1 part by mass relative to 100 parts by mass of a total of the components (A) and (B).

In the present invention, a known air-drying unsaturated resin may be used in combination. In such a case, the non-volatile content (resin solid content) is preferably 30% to 70% by mass. If the non-volatile content is out of this range, satisfactory coating workability cannot be obtained.

In the present invention, in order to adjust the curing rate, a radical curing agent, a photo-radical initiator, and a polymerization inhibitor may be added and used.

Examples of the radical curing agent include organic peroxides. Specific examples thereof include publicly known organic peroxides such as benzoyl peroxides, diacyl peroxides, peroxy esters, hydroperoxides, dialkyl peroxides, ketone peroxides, peroxy ketals, alkyl peresters, and percarbonates. Among these organic peroxides, benzoyl peroxides are preferable. The amount of radical curing agent used is preferably 0.1 to 6 parts by bass relative to 100 parts by mass of a total of the (A) and (B) in the composition.

Examples of the photo-radical initiator, i.e., photosensitizer include benzoin ethers such as benzoin alkyl ethers; benzophenones such as benzophenone, benzil, and methylorthobenzoyl benzoate; acetophenones such as benzyl dimethyl ketal, 2,2-diethoxyacetophenone, 2-hydroxy-2-methylpropiophenone, 4-isopropyl-2-hydroxy-2-methylpropiophenone, and 1,1-dichloroacetophenone; and thioxanthones such as 2-chlorothioxanthone, 2-methylthioxanthone, and 2-isopropylthioxanthone.

Examples of the polymerization inhibitor include trihydrobenzene, toluhydroquinone, 14-naphthoquinone, parabenzoquinone, hydroquinone, benzoquinone, hydroquinone monomethyl ether, p-tert-butylcatechol, and 2,6-di-tert-butyl-4-methylphenol. Preferably, the polymerization inhibitor is added to the composition so that the concentration thereof is 10 to 1,000 ppm.

In the composition of the present invention, in addition to the above components, various additives such as fillers, ultraviolet absorbers, pigments, thickeners, low-shrinking agents, antioxidants, plasticizers, aggregates, flame retardants, stabilizers, and fiber reinforcing materials may be used.

Examples of the filler include hydraulic silicate materials, a calcium carbonate powder, clay, an alumina powder, a silica stone powder, talc, barium sulfate, a silica powder, a glass powder, glass beads, mica, aluminum hydroxide, cellulose, silica sand, quartz sand, river sand, crystalline limestone, marble waste, crushed stone, and powders obtained by firing and hardening a colored green body for pottery or porcelain and crushing the resulting fired body.

As the filler for imparting thixotropy, asbestos, sepiolite, a silica powder such as Aerosil may be added. Besides the above filler examples, colored pigments and dyes can also be used as the filler. For example, titanium oxide, barium sulfate, carbon black, chrome vermilion, colcothar, ultramarine blue, cobalt blue, phthalocyanine blue, or phthalocyanine green is used. As for the amount of filler added, 1 to 500 parts by mass of the filler is mixed with 100 parts by mass of the composition of the present invention and the resulting mixture can be provided for coating.

The composition of the present invention can be cured at a temperature range of −30° C. to 50° C. within two hours using a known redox catalyst including a curing agent and a curing accelerator in combination.

In order to stabilize adhesiveness to a base and to improve the durability of the adhesion strength with the filler, a silane coupling agent such as γ-methacryloxypropyltrimethoxysilane, γ-glycydoxypropyltrimethoxysilane, N-β-(aminoethyl)-γ-aminopropyltrimethoxysilane, or γ-mercaptopropyltrimethoxysilane may be added to the composition of the present invention.

The amount of primer composition of the present invention applied is preferably 50 to 500 g/m², and preferably 100 to 250 g/m². Known means such as a brush, a roll, and a spray gun can be used as coating means.

A waterproof floor slab structure of the present invention is obtained by essentially applying the primer composition of the present invention directly onto a concrete floor slab base with the above coating means, subsequently applying a radical-curable resin-based waterproof material onto the primer composition, and providing a pavement layer composed of an asphalt paving material or the like on the waterproof material.

The radical-curable resin-based waterproof material is an ether radical-curable resin, and is a resin composition prepared by dissolving at least one vinyl ester resin selected from an epoxy (meth)acrylate resin, a polyester (meth)acrylate resin, and a urethane (meth)acrylate resin in the polymerizable unsaturated monomer (B) described above. A cured product of the material preferably has a tensile elongation of 10% or more at a low temperature (−10° C.). A urethane (meth)acrylate resin composition is preferable, and a urethane methacrylate resin composition is particularly preferable.

The asphalt paving material is used as follows. An asphalt composition containing asphalt and a selected aggregate is mixed at a heating temperature of 150° C. to 260° C., and preferably 150° C. to 180° C., and the mixture is laid on a waterproof layer for a floor slab and is compacted with a roller. Thus, the asphalt paving material is formed as a pavement layer on the waterproof layer for the floor slab. Examples of the asphalt include natural asphalt such as lake asphalt, rock asphalt, and asphaltite; petroleum asphalt such as straight asphalt and blown asphalt; semi-blown asphalt; hard asphalt; and asphalt modified by incorporating a thermosetting resin, a thermoplastic resin, a rubber, or the like in any of the above asphalt.

According to a method for waterproofing a floor slab of the present invention, a method for forming a waterproof floor slab pavement structure includes forming a primer layer composed of the primer composition of the present invention by directly applying the primer composition onto a floor slab, forming a waterproof layer composed of a cured product of an ether radical-curable resin composition, the cured product having a tensile elongation of 10% or more at a low temperature (−10° C.) and then forming a pavement layer composed of the asphalt paving material.

EXAMPLES

Synthesis Example 1

PTMG 1,000-Based Resin

To a 1-L four-necked flask equipped with a thermometer, a stirrer, an inert gas inlet, an air inlet, and a reflux condenser, 500 g polytetramethylene glycol (abbreviated as "PTMG") having a number-average molecular weight of 1,000 and 174 g of tolylene diisocyanate (abbreviated as "TDI") were charged, and the reaction mixture was allowed to react in a nitrogen stream at 80° C. for four hours. Since the NCO equivalent became 600, which is approximately a theoretical equivalent value, the temperature was cooled to 50° C. In an air stream, 0.07 g of hydroquinone was added to the mixture, and 130 g of 2-hydroxyethyl methacrylate (abbreviated as "HEMA") was added thereto. The resulting mixture was allowed to react at 90° C. for five hours. At the time when the NCO % became 0.1% or less, 0.07 g of tert-butylcatechol (abbreviated as "TBC") was added to the mixture. Thus, a urethane methacrylate resin composition (a) having a number-average molecular weight of 1,608 was obtained.

Synthesis Example 2

PTMG 500-Based Resin

A urethane methacrylate resin composition (b) having a number-average molecular weight of 1,108 was synthesized as in Synthesis Example 1 using PTMG having a number-average molecular weight of 500, TDI, and HEMA with the same molar mixing ratio as that of Synthesis Example 1.

Synthesis Example 3

PTMG 650-Based Resin

A urethane methacrylate resin composition (c) having a number-average molecular weight of 1,258 was synthesized as in Synthesis Example 1 using PTMG having a number-average molecular weight of 650, TDI, and HEMA with the same molar mixing ratio as that of Synthesis Example 1.

Synthesis Example 4

PTMG 2,000-Based Resin

A urethane methacrylate resin composition (d) having a number-average molecular weight of 2,608 was synthesized as in Synthesis Example 1 using PTMG having a number-average molecular weight of 2,000, TDI, and HEMA with the same molar mixing ratio as that of Synthesis Example 1.

Synthesis Example 5

PTMG 3,000-Based Resin

A urethane methacrylate resin composition (e) having a number-average molecular weight of 3,608 was synthesized as in Synthesis Example 1 using PTMG having a number-average molecular weight of 3,000, TDI, and HEMA with the same molar mixing ratio as that of Synthesis Example 1.

Synthesis Example 6

PPG 1,000-Based Resin

A urethane methacrylate resin composition (f) having a number-average molecular weight of 1,608 was synthesized as in Synthesis Example 1 using polyoxypropylene glycol (abbreviated as "PPG") having a number-average molecular weight of 1,000, TDI, and HEMA with the same molar mixing ratio as that of Synthesis Example 1.

Synthesis Example 7

PPG 700-Based Resin

A urethane methacrylate resin composition (g) having a number-average molecular weight of 1,308 was synthesized as in Synthesis Example 1 using PPG having a number-average molecular weight of 700, TDI, and HEMA with the same molar mixing ratio as that of Synthesis Example 1.

Synthesis Example 8

PPG 2,000-Based Resin

A urethane methacrylate resin composition (h) having a number-average molecular weight of 2,608 was synthesized as in Synthesis Example 1 using PPG having a number-average molecular weight of 2,000, TDI, and HEMA with the same molar mixing ratio as that of Synthesis Example 1.

Synthesis Example 9

[Preparation of Resin Composition (1) for Waterproof Material]

To a 1-L four-necked flask equipped with a thermometer, a stirrer, an inert gas inlet, an air inlet, and a reflux condenser, 500 g of PPG having a number-average molecular weight of 1,000 and 174 g of IDI were charged, and the reaction mixture was allowed to react in a nitrogen stream at 80° C. for four hours. Since the NCO equivalent became 600, which is approximately a theoretical equivalent value, the temperature was cooled to 50° C., in an air stream, 0.07 g of hydroquinone was added to the mixture, and 130 g of 2-hydroxyethyl methacrylate (abbreviated as "HEMA") was added thereto. The resulting mixture was allowed to react at 90° C. for five hours. At the time when the NCO % became 0.1% or less, 0.07 g of tert-butylcatechol (abbreviated as "TBC") was added to the mixture. Thus, a polyether urethane methacrylate resin composition was obtained. This resin composition was dissolved and diluted in 345 g of MMA to prepare a urethane methacrylate resin composition (1) for a waterproof material, the resin composition having a non-volatile content of 70%.

Examples 1 to 9

Primer compositions having the compositions shown in Table 1 were prepared using the urethane methacrylate resins (a), (c), (d), and (f) described in she above synthesis examples. Each of the primer compositions was applied onto a concrete pavement plate stipulated in Japanese Industrial Standard (JIS) in an amount of 0.2 kg/m² to form a primer layer. A waterproof material (2) for a floor-slab waterproof layer, which will be described below, was applied onto the primer layer. A blistering test, a tensile adhesive strength test, and a crack-load-following capability test described below were performed.

Comparative Examples 1 to 7

Primer compositions having the compositions shown in Table 2 were prepared using the urethane methacrylate resins (a), (b), (e), (g), and (h) described in the above synthesis examples. Each of the primer compositions was applied onto a concrete pavement plate stipulated in JIS in an amount of 0.2 kg/m² to form a primer layer. The waterproof material (2) for a floor-slab waterproof layer, which will be described below, was applied onto the primer layer. The blistering test, the tensile adhesive strength test, and the crack-load-following capability test described below were performed.

Preparation of Waterproof Material (2) for Floor-Slab Waterproof Layer

A resin composition was prepared by mixing 100 parts of the urethane methacrylate resin composition (1) for the waterproof material, 0.3 parts of PTD-2EO, 0.2 parts of a paraffin wax, and 0.5 parts of cobalt octoate. Subsequently, 2 parts of NYPER NS (product containing 40% of benzoyl peroxide (BPO), manufactured by NOF Corporation) was added to the resin composition to prepare a waterproof material (2) for a floor-slab waterproof layer. In each test, a specified amount of this waterproof material (2) was applied and cured to form a waterproof layer.

<Calculation Example of the Number of Moles of (B)/the Number of Moles of (A)>
{the number of parts of (B-1) mixed/molecular weight of (B-1)+the number of parts of (B-2) mixed/molecular weight of (B-2)}/(the number of parts of resin mixed/number-average molecular weight of resin)
Example: resin (a) 70 parts, β-HEMA 5 parts, MMA 25 parts
(5/130+25/100)/(70/1608)=6.6

Viscosity

The temperature of the primer composition was adjusted to 25° C., and the viscosity of the composition was measured in accordance with JIS K 6901 5.5.

From the standpoint of a viscosity for which no problem in terms of workability occurs when a large machine is not used, a composition having a viscosity of 1,000 mPa·s or less was evaluated as "A", and a composition having a viscosity higher than 1,000 mPa·s was evaluated as "C".

Blistering Test

A surface of a pavement plate (300 mm×300 mm×60 mm) stipulated in JIS was sanded with #60 sandpaper. A primer composition of the present invention was applied onto the surface in an amount of 0.2kg/m². After the primer composition was cured and dried, the waterproof material (2) for a floor-slab waterproof layer was applied onto the primer composition in an amount of 2.0 kg/m² to form a waterproof layer. The waterproof layer was cured and dried to prepare a blistering test specimen. Assuming that asphalt paving is performed on the waterproof layer, the blistering test specimen was left to stand in a dryer at 160° C. for one hour. The surface of the waterproof layer was then observed.

Tensile Adhesive Strength Test

A surface of a pavement plate (300×300×60 mm) stipulated in JIS was sanded with #60 sandpaper. A primer composition of the present invention was applied onto the surface in an amount of 0.2 kg/m². After the primer composition was cured and dried, the waterproof material (2) for a floor-slab waterproof layer was applied onto the primer composition in an amount of 2.0 kg/m² to form a waterproof layer having predetermined specifications. Furthermore, a hot asphalt mixture was paved on the waterproof layer. Dense-graded asphalt concrete (13 mm Top) was used as the hot asphalt mixture. The mixing temperature was 153° C. to 159° C., and rolling compaction was performed at 142° C. to 147° C. (paving temperature) with a hand roller and a roller compactor. The asphalt mixture was compacted to have a thickness of 40 mm. A circular cut having a diameter φ of 100 mm was formed in the test specimen with a core cutter so as to reach the concrete layer. In the tensile test, a steel adhesion plate having a diameter φ of 100 mm was bonded with an epoxy adhesive to the portion of the asphalt concrete where the cut was formed. After the adhesive was cured, a tensile test was conducted at 23° C. at a test speed of 0.98 N/mm²·s using a hydraulic adhesion tester manufactured by Yamamoto kojyuki Co., Ltd. A test specimen having a strength of 0.6 N/mm² or more was evaluated as "acceptable (A)", and a test specimen having a strength 0.6 N/mm² or less was evaluated as "not acceptable". In addition, the separated state was observed.

180-Degree Bending Test

A primer composition of the present invention was applied onto a glass plate in an amount of 2.0 kg/m² and was cured and dried. The glass plate was formed so as to have dimensions of 250 mm in length×30 mm in width (thickness: about 2 mm), and was left to stand at −10° C. for two hours or more. The glass plate was bent 180 degrees around a steel bar having a diameter of 10 mm in an atmosphere of −10° C., and the fractured state was observed. Note that this test and a crack-load following test are significantly correlated with each other, and thus in the case where the crack-load following test could not be performed for a specimen, only this test was performed therefor.

Crack-Load Following Test (Japan Highway Public Corporation Testing Laboratory; Waterproof System, Design and Construction Manual, 2001)

At a test temperature (23±2° C.), a specimen was prepared as follows. A surface of a pavement plate (300 mm×300 mm×60 mm) stipulated in JIS was sanded with #60 sandpaper. A primer composition of the present invention was applied onto the surface in an amount of 0.2 kg/m². After the primer composition was cured and dried, the waterproof material (2) a floor-slab waterproof layer was applied onto the primer composition in an amount of 2.0 kg/m² to form a waterproof layer having predetermined specifications. Furthermore, a hot asphalt mixture was paved on the waterproof layer. A central portion of the specimen was cut with a concrete cutter into two equal portions (150 mm×300 mm×100 mm). In order to induce cracks in the specimen to be subjected to a crack load, cuts were formed on the top surface and the bottom surface of the specimen.

The initial crack width was adjusted to 0.25 mm. Opening and closing of cracks was performed at a crack amplitude of ±0.15 mm and using a sine wave of 10 Hz.

The presence or absence of defects on the waterproof layer was examined after 4,800,000 cycles. When no defects were observed on the waterproof layer, the specimen was evaluated as "acceptable (A)". When defects were observed on the waterproof layer, the specimen was evaluated as "not acceptable (C)".

TABLE 1

|   |   | Example 1 | Example 2 | Example 3 | Example 4 | Example 5 | Example 6 | Example 7 | Example 8 | Example 9 |
|---|---|---|---|---|---|---|---|---|---|---|
| A-1 | Resin (a) | 70 | 45 |  |  | 35 | 25 | 20 | 70 |  |
|  | Resin (c) |  |  | 70 |  |  |  |  |  |  |
|  | Resin (d) |  |  |  | 60 |  |  |  |  | 70 |
| A-2 | Resin (f) |  |  |  |  | 35 | 25 | 20 |  |  |
| B-1 | β-HEMA | 5 | 5 | 5 | 5 | 5 | 5 | 5 | 10 | 5 |
| B-2 | MMA | 25 | 50 | 25 | 35 | 25 | 0 | 0 | 20 | 25 |
|  | PHOEMA | 0 | 0 | 0 | 0 | 0 | 45 | 0 | 0 | 0 |
|  | DCPDOEMA | 0 | 0 | 0 | 0 | 0 | 0 | 55 | 0 | 0 |
| C | PTD-2EO | 0.3 | The same as the left | The same as the left | The same as the left | The same as the left | The same as the left | The same as the left | The same as the left | The same as the left |
| D | Paraffin wax | 0.2 | The same as the left | The same as the left | The same as the left | The same as the left | The same as the left | The same as the left | The same as the left | The same as the left |
| E | Cobalt octoate | 0.5 | The same as the left | The same as the left | The same as the left | The same as the left | The same as the left | The same as the left | The same as the left | The same as the left |
| F | NYPER NS | 2 | The same as the left | The same as the left | The same as the left | The same as the left | The same as the left | The same as the left | The same as the left | The same as the left |
|  | Molar ratio of B/A | 6.6 | 16 | 5.2 | 17 | 6.6 | 8.3 | 10 | 6.4 | 6.9 |
|  | Viscosity | A | A | A | A | A | A | A | A | A |
|  | Blistering test | A | A | A | A | A | A | A | A | A |
|  | Tensile adhesive strength test | A | A | A | A | A | A | A | A | A |
|  | Separated state after tensile adhesive strength test | A | A | A | A | A | A | A | A | A |
|  | 180-Degree bending test | A | A | A | A | A | A | A | A | A |
|  | Crack-load following test | A | A | — | — | — | A | — | A | A |

β-HEMA: 2-hydroxyethyl methacrylate
MMA: methyl methacrylate
PHOEMA: phenoxy methacrylate
DCPDOEMA: dicyclopentenyloxyethyl methacrylate
NYPER NS (product containing 40% of benzoyl peroxide (BPO), manufactured by NOF Corporation)
PTD-2EO: para-toluidine-ethylene oxide 2-mole adduct
Cobalt octoate: a cobalt octoate solution containing 8% of cobalt <Viscosity>
A: 1,000 mPa·s or less
C: higher than 1,000 mPa·s
<Blistering Test>
A: Blistering was not observed.
C: Blistering was observed.
<Tensile Adhesive Strength Test>
A: Strength: 0.6 N/mm² or more
C: Strength: less than 0.6 N/mm²
<Separated State After Tensile Adhesive Strength Test>
A: The base was broken.
B: A part of the base was broken.
C: Interlaminar separation was observed.
<−10° C.×180-Degree Bending Test>
A: Neither breaking occurred nor cracks of the primer layer were formed.
C: Either cracks of the primer layer were formed or breaking occurred.
<Crack-Load Following Test>
A: No defects were observed on the waterproof layer.
C: Defects were observed on the waterproof layer.

NYPER NS (product containing 40% of benzoyl peroxide (BPO), manufactured by NOF Corporation)
PTD-2EO: para-toluidine-ethylene oxide 2-mole adduct
Cobalt octoate: a cobalt octoate solution containing 8% of cobalt

INDUSTRIAL APPLICABILITY

According to the present invention, since a large machine is not required for application, it is possible to provide a method for waterproofing a floor slab, the method having no problems of troublesome application of a primer and a radical-curable resin-based waterproof material. In addition, by directly applying the primer composition of the present invention used for waterproofing a floor slab onto an existing floor slab layer or a newly established floor slab layer on a base, it is possible to provide a waterproof floor slab structure having a close-contact structure that includes a concrete floor slab and a radical-curable resin-based waterproof material and that has a good crack-load-following capability, blistering resistance, adhesiveness, and bending resistance.

The invention claimed is:

1. A primer composition for application to concrete, the primer composition comprising a resin composition containing (A) a urethane (meth)acrylate resin (A-1) obtained by reacting a hydroxyalkyl (meth)acrylate (A-1-3) with a terminal-isocyanate-group-containing urethane prepolymer obtained by reacting polytetramethylene glycol (A-1-1) having a number-average molecular weight of 650 to 2,000 with a polyisocyanate component (A-1-2), or a mixture of the urethane (meth)acrylate resin (A-1) and a urethane (meth)acrylate resin (A-2) obtained by reacting a hydroxyalkyl (meth)acrylate (A-2-3) with a terminal-isocyanate-group-containing urethane prepolymer obtained by reacting a polyether polyol (A-2-1) selected from polyoxypropylene diol

TABLE 2

| | | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|
| A-1 | Resin (a) | 80 | 40 | | | | | 70 |
| | Resin (b) | | | 60 | | | | |
| | Resin (e) | | | | 70 | | | |
| A-2 | Resin (g) | | | | | 70 | | |
| | Resin (h) | | | | | | 70 | |
| B-1 | β-HEMA | 5 | 5 | 5 | 5 | 5 | 5 | 0 |
| B-2 | MMA | 15 | 55 | 35 | 25 | 25 | 25 | 30 |
| | PHOEMA | 0 | 0 | 0 | 0 | 0 | 0 | 0 |
| | DCPDOEMA | 0 | 0 | 0 | 0 | 0 | 0 | 0 |
| C | PTD-2EO | 0.3 | The same as the left | The same as the left | The same as the left | The same as the left | The same as the left | The same as the left |
| D | Paraffin wax | 0.2 | The same as the left | The same as the left | The same as the left | The same as the left | The same as the left | The same as the left |
| E | Colbalt octoate | 0.5 | The same as the left | The same as the left | The same as the left | The same as the left | The same as the left | The same as the left |
| F | NYPER NS | 2 | The same as the left | The same as the left | The same as the left | The same as the left | The same as the left | The same as the left |
| | Molar ratio of B/A | 3.8 | 24 | 7.2 | 15 | 14 | 11 | 6.9 |
| | Viscosity | C | A | A | A | A | A | A |
| | Blistering test | A | A | A | A | A | A | A |
| | Tensile adhesive strength test | A | A | A | C | A | C | A |
| | Separated state after tensile adhesive strength test | A | A | A | A | A | A | C |
| | 180-Degree bending test | A | C | C | A | C | A | A |
| | Crack-load following test | — | C | — | — | — | — | A |

Com. Ex.: Comparative Example

β-HEMA: 2-hydroxyethyl methacrylate
MMA: methyl methacrylate
PHOEMA: phenoxy methacrylate
DCPDOEMA: dicyclopentenyloxyethyl methacrylate and polyoxyethylene diol and having a number-average molecular weight of 650 to 2,000 with a polyisocyanate component (A-2-2);
- (B) a polymerizable unsaturated monomer containing a hydroxyalkyl (meth)acrylate (B-1) and a polymerizable unsaturated monomer (B-2) other than the (A-1), the (A-2), and the (B-1); (C) a curing accelerator; (D) a paraffin wax; and (E) a cobalt organic acid salt, wherein a molar ratio of the (B)/the (A) is 4 to 20, a mass ratio of the (A-1)/the (A-2) is 100/0 to 10/90, and a mass ratio of the (B-1)/the (B-2) is 35/65 to 5/95.

2. The primer composition for application to concrete according to claim 1, wherein the hydroxyalkyl (meth)acrylates (A-1-3) and (A-2-3) are each 2-hydroxyethyl methacrylate.

3. The primer composition for application to concrete according to claim 1, wherein the hydroxyalkyl (meth)acrylate (B-1) is 2-hydroxyethyl methacrylate.

4. The primer composition for application to concrete according to claim 1, wherein the polymerizabie unsaturated monomer (B-2) other than the (B-1) is at least one selected from methyl methacrylate, phenoxyethyl methacrylate, and dicyclopentenyloxyethyl methacrylate.

5. The primer composition for application to concrete according to claim 1, wherein the curing accelerator (C) is an amine compound.

6. A waterproof floor slab structure comprising at least, from the bottom, a floor slab; a layer composed of a cured product of the primer composition for application to concrete according to claim 1; a layer composed of a cured product of a radical-curable resin-based waterproof material for the floor slab; and an asphalt pavement layer, in that order.

7. A method for waterproofing a floor slab, comprising applying, onto a floor slab, the primer composition for application to concrete according to claim 1; subsequently applying a radical-curable resin-based waterproof material for the floor slab; and laying an asphalt paving material.

* * * * *